T. J. BUTLER.
Cutting Grooves in Hubs.
No. 1,458.
Patented Dec. 31, 1839.
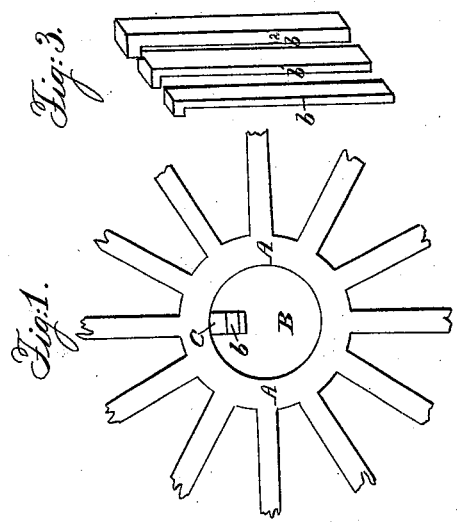

UNITED STATES PATENT OFFICE.

THOS. J. BUTLER, OF JOHNSTOWN, PENNSYLVANIA.

MODE OF CUTTING SEATS, SLOTS, OR GROOVES FOR THE RECEPTION OF KEYS IN THE HUBS AND AXLES OF CAR-WHEELS AND IN OTHER MACHINERY.

Specification of Letters Patent No. 1,458, dated December 31, 1839; Antedated July 1, 1839.

*To all whom it may concern:*

Be it known that I, THOMAS J. BUTLER, of Johnstown, in the county of Cambria and State of Pennsylvania, have invented a new and useful Mode of Cutting Seats, Slots, or Grooves for Keys in the Bore of the Hubs of Wheels and in the Axles of Railroad-Cars and Carriages of Various Descriptions, as well as in other pieces of machinery in which seats for keys or slots are to be cut, which I effect by means of certain new apparatus or tools adapted thereto; and I do hereby declare that the following is a full and exact description thereof.

I employ for the purpose of cutting the seats, slots, or grooves, in the hubs and axles of car wheels, and in other machinery for the insertion of keys to attach them to each other, what I denominate blocks and keys, and a suitable cutting chisel, all of which are represented in the accompanying drawings.

In Figure 1, A, A, is the end of the hub of a wheel in which seats, or slots, are to be cut, and B, a block which fits accurately into the bore of the hub, and rests upon it by means of a suitable head, or shoulder, by which it is supported on the end of the hub.

Fig. 2, is a section through the axis of the block and hub, showing at $a$, $a$, the bearing of the head of the block on the end of the hub. The block B, has a groove along it from end to end, to admit the cutting chisel, and a succession of guide keys, by means of which the feed of the chisel in cutting is to be regulated.

Fig. 3, represents three guide keys, $b$, $b^1$, and $b^2$; one of which is shown as in use at $b$, Fig. 2. The cutting chisel is shown at Fig. 4, marked C, the part $c$ being its cutting edge. It is seen in place in Fig. 2. The line $d$, $d$, in this figure shows the bottom of the groove for the admission of the chisel C, and the guide keys $b$, $b$; the chisel may be of such thickness as just to cut a chip in the hub when driven down through the groove, after which a guide key $b$, the proper thickness of a chip, is to be inserted in the bottom of the groove, and the chisel again driven through. The guide keys are to be made of various thicknesses, so that the thinner one may be taken out as the work proceeds. Three, or any other required number of, seats, slots, or grooves, may be thus successively cut in the hub by shifting the block around to the required position.

Fig. 5, represents the apparatus as constructed for cutting the seats, slots, or grooves, in the axle. D, is a block of iron having a concavity on its flat side to receive the axle E, which is secured in place by iron bands, or clips, F, F. A groove to receive the guide keys, $b$, $b$, and the chisel C, is made along this block, in the proper position for cutting the key seats, as will be clearly understood by the figure. The guide keys used with this part of the apparatus should be something shorter than the block to allow space for the delivery of the chips, which would otherwise be obstructed by the shoulder G, of the axle upon which the block D, rests.

When the seats, or slots, are to be cut in the hub of a wheel, the wheel should be placed on a log, or block, having a hole made in it large enough to contain the cuttings. The axle, in like manner, may be secured in any convenient way, the process of cutting being the same in each.

Although I have represented the chisel and guide keys as adapted to square, or rectangular, seats, slots, or grooves, it will be manifest that they may be made so as to cut a semi-circle in the hub, and in the axle, to receive a round pin, or key; or that any other required form may be given to them.

What I claim as my invention, and desire to secure by Letters Patent, in the within-described apparatus, is—

The employment of grooved blocks for the reception of guide keys and wedges, for the cutting of key seats, or grooves, in the hubs and axles of cars, and other machinery; said blocks, guide keys and chisel, being constructed, and used, substantially in the manner herein set forth.

THOS. J. BUTLER.

Witnesses:
M. CANAN,
R. B. GUGELY.